United States Patent Office 3,188,547
Patented June 8, 1965

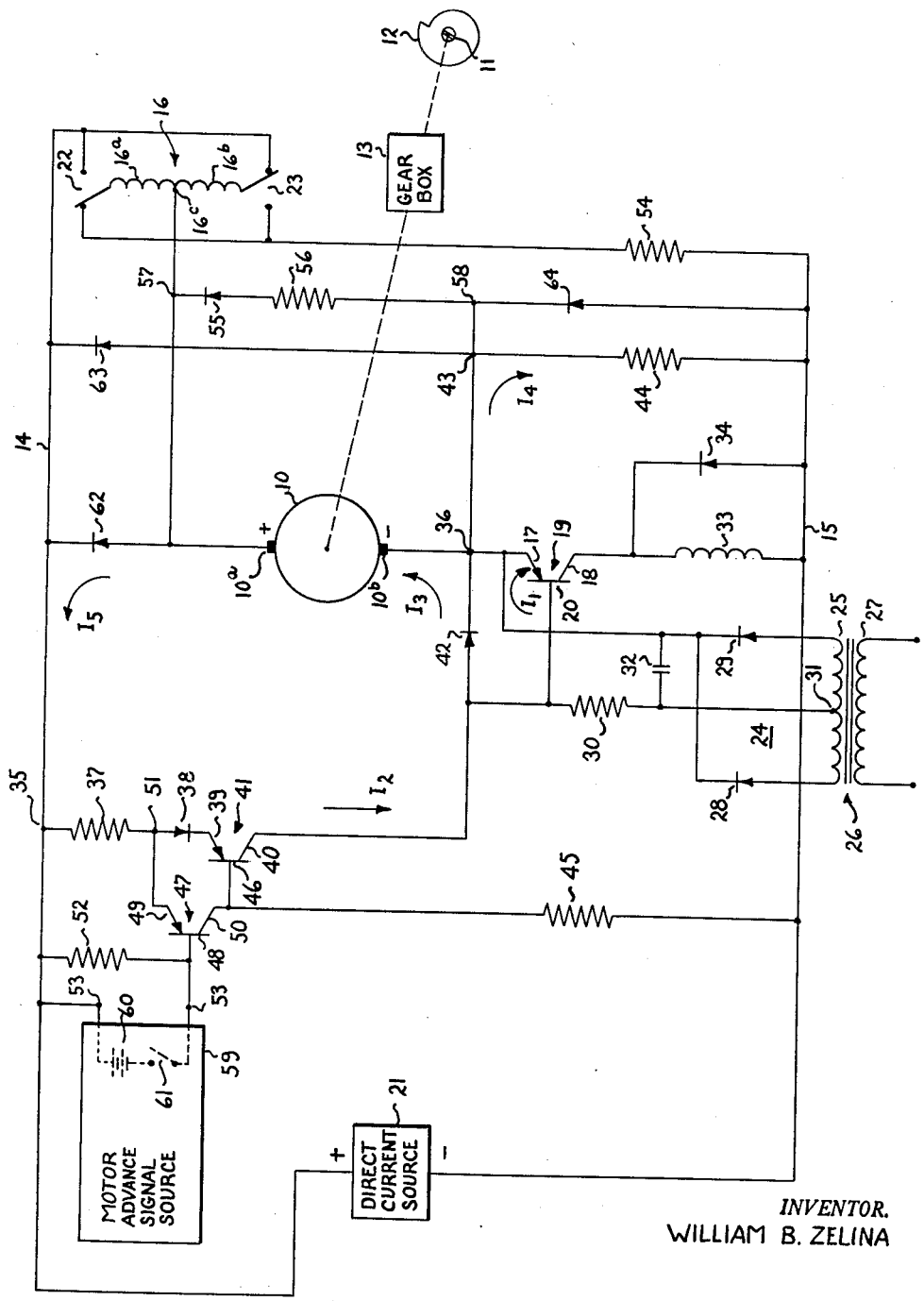

3,188,547
POSITIONING MOTOR CONTROL SYSTEM
William B. Zelina, Erie, Pa., assignor to General Electric Company, a corporation of New York
Filed June 18, 1962, Ser. No. 203,213
7 Claims. (Cl. 318—370)

This invention relates to a positioning motor system, and more particularly relates to control of energization and braking of a motor required to accurately drive and position a movable device.

Positioning motors are utilized in many applications to move a device to a desired position upon occurrence of a given signal or command. Quite often positioning motor systems are utilized as part of a servo system in which a driven object is positioned in accordance with some condition or occurrence affecting the overall system. One example of such a system is shown in U.S. Patent No. 2,566,898, assigned to the same assignee as the present invention, where a motor drives a cam shaft having cams thereon which sequentially make and break electrical connections of a traction motor circuit as the motor is driven, and the motor is either driven or stopped, dependent on a sensed condition of the traction motor circuit.

Where motors are utilized as positioning elements in such systems, they should preferably be capable of fast starting and rapid stopping, usually by dynamic braking, to ensure quick and accurate positioning of a driven element. Proper interlocking should be provided between switching devices when switching from motoring to dynamic braking circuits to avoid possibly subjecting the switching devices to damaging transient or short circuit conditions when switching from motoring operation to braking operation. This last mentioned consideration is particularly important where semiconductor elements are used to set up and control motoring and braking circuits.

Accordingly, this invention provides a simplified control system for a positioning motor which successfully accomplishes the aforementioned considerations in a new and improved manner.

It is an object of this invention to provide a new and improved control system for a positioning motor wherein the motor may be rapidly started upon occurrence of a signal to advance and which may be quickly switched to a dynamic braking mode of operation upon cessation of the advancing signal to quickly stop the motor, and wherein the motoring and braking circuits are electrically interlocked so that only one can be operative at a time.

It is another object of this invention to provide such a control system which provides a plugging current to the motor to aid in stopping the motor when dynamic braking current fades out.

It is a further object of this invention to provide such a control system wherein semiconductor devices are utilized in the switching mode in interlocking fashion to control setup of motoring and dynamic braking circuits.

Briefly stated, the invention in one form thereof, comprises a motor in a circuit with a switching transistor normally biased to saturation, but held in a non-conductive state by current through a circuit path which back-biases the transistor. This circuit path further comprises a portion of a dynamic braking circuit so that when the motor is operated in the braking mode or the system receives no advance signal, the switching transistor is cut off and the motoring circuit is open. The circuit path mentioned further provides a plugging current to the motor which brakes the motor upon fadeout of dynamic braking. Upon occurrence of a motor advance signal, the current in said circuit path is cut off and the transistor switches on to establish a motoring circuit. Upon cessation of the advance signal, dynamic braking current biases the transistor off and opens the motoring circuit.

The novel features of the invention are pointed out with particularity in the claims appended to and forming part of this specification. The invention, however, both as to its organization and operation, together with further objects and advantages thereof, may best be appreciated by the written description taken in conjunction with the single figure of the drawings which illustrates a control system for a positioning motor embodying the invention.

Reference is now made to the drawing, which illustrates a positioning or servo motor 10 adapted to drive an element which may comprise a cam shaft 11 having a plurality of cams thereon, exemplified by cam 12, which, upon rotation of shaft 11, are arranged to sequentially operate a plurality of electric contacts, as illustrated in the aforementioned patent. In most applications, the driving speed will be reduced through a gearing arrangement, as exemplified by gear box 13, represented in block form.

The armature terminals 10a and 10b of motor 10 are connected between positive bus line 14 and ground, or negative bus line 15 through either of portions 16a or 16b of the split series field 16, and through the emitter 17-collector 18 circuit of transistor 19, which also has a base electrode 20. Lines 14 and 15 are connected to a source of direct current, as represented in block form 21. Either portion 16a or 16b of series field 16 may be connected in circuit with the armature of motor 10 by virtue of ganged reversing switches 22 and 23 having forward F and reverse R contacts to provide directional control of motor 10. Transistor 19 is forward biased for conduction by a biasing means which is illustrated as comprising a full wave rectifier 24 connected across the secondary winding 25 of a transformer 26 having a primary winding 27 connected to an alternating current source, not shown. Rectifier 24 further comprises unidirectional conducting devices 28 and 29 having a common connection to emitter 17 and a return path from base 20 through current-limiting resistor 30 to center tap 31 on transformer secondary 25. A filter capacitor 32 is also provided. Resistance 30 is selected to be of such value that biasing current $I_1$ through the emitter 17-base 20 circuit of transistor 19 will produce saturation current flow through the emitter 17-collector 18 circuit of transistor 19 when the emitter-collector circuit is conducting. The method of biasing transistor 19 may be of any convenient form and the one illustrated is only exemplary.

It will be noted an inductance 33 is included in series with the emitter 17-collector 18 circuit of transistor 19 for reasons hereinafter explained. A free-wheeling diode 34 is connected across inductance 33.

From the circuitry thus far described, it may be seen that when transistor 19 is conductive, a motoring circuit is established and current will flow from line 14 through portion 16b, the armature of motor 10, and hence to negative line 15 to thereby energize the armature of motor 10 and cause it to drive cam shaft 11.

Connected between point 35 on positive line 14 and point 36 between emitter 17 and armature terminal 10b is a circuit path comprising resistance 37, diode 38, the emitter 39-collector 40 circuit of transistor 41, and diode 42, which is also connected between the base 20 and emitter 17 of transistor 19. This circuit path continues from point 36 to point 43, and hence to negative line 15 through resistance 44. Transistor 41 is arranged, by section of the value of resistance 45 in its emitter 39-base 46 circuit, to be normally saturated, and the circuit components are so arranged that the current $I_2$ therethrough is sufficient to produce a voltage drop across diode 42 which places a back bias on transistor 19 and renders transistor 19 non-conductive when transistor 41 is conductive. Current $I_2$ is set primarily by the value of resistance 44 and the parameters are so chosen that the potential at point 43 is greater than the potential at point 16c on series field 16 to thus prevent undesired flow of current through motor 10.

Another transistor 47 having base 48, emitter 49 and collector 50 electrodes is provided having the emitter 49 connected at point 51 between resistance 37 and diode 38. Collector 50 is directly connected to the base 46 of transistor 41 which is connected between positive line 14 and base 48, which is adapted to receive an input signal between terminals 53. Resistance 52 is selected to provide temperature stability for transistor 47. Should temperature increase, the static resistance between the base and collector of transistor 47 tends to decrease, which may cause a small emitter-collector turn-on current to flow. Resistance 52 nullifies this tendency by providing a reverse current bias to bias the base-to-collector circuit of transistor 47. Under zero input signal conditions, transistor 41 will be turned on and conducting due to current flow from line 14 through emitter 39, base 46 and resistance 45. When transistor 41 is conducting there will be very little voltage difference between point 51 and collector 50 of transistor 47, and transistor 47 having its emitter 49 connected to point 51 and its base 48 back biased will be non-conductive in the absence of an input signal at terminal 53.

Considering the operation of the circuit as thus far described, it may be seen that current $I_1$ will flow from the diodes 28, 29 through the emitter 17-base 20 circuit of transistor 19, tending to turn transistor 19 on and establish a current path from line 14 to the armature of motor 10 to line 15. However, current $I_2$ is flowing from line 14 through emitter 39-collector 40 circuit of transistor 41 and through diode 42 which is connected between the base 20 and emitter 17 of transistor 19 to point 35. At point 36 current $I_2$ will divide into components $I_3$ and $I_4$. Current $I_3$ will flow through the armature of motor 10 in a direction opposed to the direction of flow of motoring current to point 16c on series field 16, and in the connection shown through portion 16a of field 16 to negative line 15 through resistance 54. Resistance 54 will shunt motoring current flow through field 16 past motor armature terminals 10a and 10b to thereby determine the current through field 16.

Current $I_3$ through motor 10, in accordance with the invention, will establish a negative or plugging torque on the motor for purposes hereinafter explained. Another component $I_4$ of $I_2$ flows from point 36 through resistance 44 to negative line 15. The system parameters and component values are selected, in accordance with the invention, that under all conditions when transistor 41 is conducting current, current $I_2$ shall be greater than current $I_1$ by a margin sufficient to backbias transistor 19. If current $I_2$ is greater than current $I_1$, the difference must be flowing through diode 42 providing a forward bias across diode 42, and therefore a back bias on transistor 19 to ensure that transistor 19 is in a turned-off or non-conducting state. The current $I_3$ flowing in the armature of motor 10 during standstill of motor 10 provides a negative torque on the armature which is in effect a plugging torque which greatly acts to brake the motor 10 as dynamic braking of motor 10 fades out. Current $I_3$ is selected to be of such value that the torque produced by current $I_3$ by itself produced on the armature of motor 10 is insufficient to overcome the break-away torque of motor 10 and the load thereon so that current $I_3$ could not reverse direction of rotation of motor 10 in the absence of motoring current or upon stopping of motor 10. If necessary, a diode 55 and resistance 56 may be connected across points 57 and 58 to bypass a portion of the current $I_3$ around the armature of motor 10. In this manner the desired value of current $I_3$ may be selected.

Under non-operating conditions, i.e., when the armature of motor 10 is not rotated, there will be a flow of current from line 14 to line 15, through the circuit path previously described, and transistor 19 will be turned off, thereby opening the motor armature circuit. Assume now that a motor advance input signal is applied to terminals 53 from a motor advance signal source 59, illustrated in block form. The signal source 59 may be of any preferred construction as the overall system in which the invention is used requires. However, for purposes of illustration, the signal source is shown as a battery 60 and switch 61. When line 14 goes sufficiently positive with respect to base 48 of transistor 47, transistor 47 is turned on. The motor advance signal will preferably have a steep leading edge to quickly turn on transistor 47 to ensure rapid starting of motor 10. When transistor 47 commences conducting, there will be essentially no voltage drop between emitter 49 and collector 50 thereof, and therefore the emitter 39 and base 46 of transistor 41, because of diode 38, will see a negative voltage difference and transistor 41 will be switched off. Resistance 37 is selected to be of small resistance value and provide regenerative action in switching transistor 41 off when transistor 47 is turned on. Transistor 47 may be termed a triggering transistor. As transistor 41 commences to turn off, the current therethrough starts to decrease, and therefore the voltage drop across resistance 37 decreases and the potential at point 51 and emitter 49 increases, hastening turn-on of transistor 47, and hence turn-off of transistor 41. This regenerative switching action also occurs in reverse when the input signal is removed from the base 48 of transistor 47. When transistor 41 is turned off, there will be no current flow $I_2$ through diode 42, and therefore current $I_1$ from the emitter 17 to the base 20 of transistor 19 will turn on transistor 19 and establish a motoring circuit from line 14 through portion 16b of series field 16, the armature of motor 10, transistor 19 and inductance 33 to negative line 15. As the armature of motor 10 is rotated, it will drive cam shaft 11 and the cams thereon towards a desired position.

At some subsequent time when it is desired to stop rotation of motor 10 when cam shaft 11 reaches a given position, the input signal will be removed from terminals 53, for example, by opening switch 61, and transistor 47 will cease to conduct, causing transistor 41 to switch on. At this time motor 10 changes from a motoring state to a generating or dynamic braking state due to its speed of rotation and motor current will reverse. When transistor 41 is switched on, a dynamic braking circuit is established from motor terminal 10a, through diode 62, resistance 37, diode 38, transistor 41, diode 42 to motor terminal 10b, and the electromotive force of motor 10 will produce a dynamic braking current $I_5$ therein which brakes motor 10 towards a halt. When motor 10 commences to operate in the braking mode, a portion of the braking current flows through field 16 and resistance 54 to negative line 15, and as point 16c rises in potential, diode 62 conducts the remainder of the braking current $I_5$. As motor 10 decreases in speed, the electromotive force generated by motor 10 decreases, as does current $I_5$. However, as the generated voltage of motor 10 decreases and current $I_5$ fades out as motor 10 slows down, current component $I_3$ of current $I_2$ provides a braking or plugging torque on motor 10 which brakes the armature of motor 10 rapidly to a halt at a desired position to quickly and accurately position cam shaft 11.

In accordance with the invention, the motoring circuit and the dynamic braking circuit are electrically interlocked so either circuit can be operative only when the other is not operative, thus adding to system reliability and protection of the static semiconductor switching devices. The circuits are arranged such that in the absence of a motor advance signal from signal source 59 the motoring circuit of motor 10 is open, and also the normally negative motor terminal 10b is held at a higher potential than positive terminal 10a. Also, removal of a motor advance signal and initiation of dynamic braking automatically opens the motoring circuit by back-biasing transistor 19 and current $I_2$ then holds the motor circuit open by continuing the backbias on transistor 19.

In designing a circuit of the type described, the resistance 45 should be selected in accordance with the gain variations of transistor 41 to ensure operation of transistor 41 in the switching mode to thus ensure rapid starting the stopping of motor 10. Inductance 33 is provided to compensate for the storage time of transistor 19, the storage time being defined as the time required for the transistor to be rendered non-conductive after its turn-on signal has been removed. During the storage time of transistor 19, it will be noted that a short circuit exists between lines 14 and 15 through transistors 41 and 19. The inductance 33 is selected so that the peak current that can flow during the storage time will be limited to a value compatible with the ratings of transitsors 41 and 19. Inductance 33 has negligible effect on the motoring operation of the system because the transistor storage time that is compensated for is in the order of a microsecond, and hence inductance 33 may be extremely small.

Diode 62, besides forming a part of the dynamic braking circuit, serves as a commutating diode for field 16. Diode 63 is provided to commutate any transients produced by the inductance of motor 10 upon termination of a motoring cycle. If the motor 10 should be in a dynamic braking mode of operation and an input signal is applied to terminals 53, it will be seen that the direction of current through the motor must quickly change. Diode 64 is provided to commutate the inductive transient produced by the opening of the dynamic braking circuit by turn-off of transistor 41 for motoring operation.

The positioning motor control system described is capable of rapidly establishing a motoring circuit upon occurrence of an input signal commanding the motor to advance and then rapidly switching to a dynamic braking mode of operation to quickly halt the motor upon cessation of the input advance command signal. Moreover, the invention further provides means for plugging the motor as the generated voltage of the motor decreases. The motoring and dynamic braking circuits are electrically interlocked so that only one can be operative at a time.

The motor is capable of bi-directional operation dependent upon the positions of ganged reversing switches 22 and 23 which can be relay contacts, and therefore remotely controlled. A motor having a shunt field might also be utilized if desired, in which case it would preferably be separately excited to ensure fast response.

While a preferred embodiment has been described and illustrated for purposes of disclosure, modifications to the disclosed embodiment of the invention as well as other embodiments thereof, which do not depart from the spirit and scope of the invention, may occur to those skilled in the art. Accordingly, it is intended to cover in the appended claims all modifications and embodiments which do not depart from the spirit and scope of the invention.

What is claimed as new and is desired to secure by Letters Patent of the United States is:

1. An arrangement for driving an object toward a desired position upon occurrence of a driving signal comprising: a motor adapted to be driveably connected to said object; circuit means for connecting said motor across a source of electrical energy, said means including a first transistor; means for providing a forward bias on said first transistor; means providing a current path across said motor, said means including a second normally conductive transistor arranged so that the current in said path provides a reverse bias on said first transistor effective to render said first transistor non-conductive to establish an interlock operative to prevent said first and second transistors from conducting at the same time; and means responsive to occurrence of a driving signal for rendering said second transistor non-conductive to remove the reverse bias from said first transistor and establish a current path through said motor.

2. The arrangement of claim 1 including a second current path connected to said first current path and including the armature of said motor, said second path being connected to said first current path such that current in said second path is in a direction to produce a negative torque on said motor with respect to its selected direction of operation when said second transistor is conductive.

3. An arrangement for driving an object toward a desired position upon occurrence of a driving signal comprising: a motor adapted to be drivably connected to said object; circuit means including a first transistor for connecting said motor across a source of electrical energy; means for providing a saturating forward bias on said first transistor; means providing a current path across said motor, said means including a second normally conductive transistor arranged so that the current in said path provides a reverse bias on said first transistor effective to render said first transistor non-conductive to establish an interlock operative to prevent said first and second transistors from conducting at the same time, said current being further effective to hold the normally negative armature terminal of said motor at a potential above the normally positive armature terminal of said motor; and means responsive to occurrence of a driving signal for rendering said second transistor non-conductive to remove the reverse bias from said first transistor and establish a current path through said motor.

4. An arrangement for driving an object toward a desired position upon occurrence of a driving signal comprising: a motor adapted to drive said object; means for connecting said motor across a source of electrical energy, said means including the emitter-collector circuit of a first transistor; means providing a saturating forward bias on said first transistor; means providing a current path across said motor, said means including the emitter-collector circuit of a second normally conducting transistor and a unidirectional conducting device connected between the base electrode and another electrode of said first transistor so that the current in said path provides a voltage drop across said unidirectional conducting device operative to reverse bias said first transistor to render said first transistor non-conductive to establish an interlock operative to prevent said first and second transistors from conducting at the same time; and means responsive to occurrence of a driving signal for rendering said second transistor non-conductive to thereby remove the reverse bias from said first transistor and rendering it conducting so that current may flow from said source of electrical energy through said motor.

5. The arrangement of claim 4 wherein said current path further comprises a resistance connected across the emitter-collector circuit of said first transistor and having a terminal thereof connected to the normally negative armature terminal of said motor, said second transistor and said resistance being selected such that upon current flow therethrough the potential at the normally negative armature terminal of said motor is of greater value than the potential at the normally positive armature terminal of said motor whereby a plugging current flows through said motor.

6. An arrangement for driving an object toward a desired position upon occurrence of a driving signal comprising: a motor adapted to drive said object; means including a first transistor for connecting said motor across a source of electrical energy; means providing a saturating forward bias on said first transistor; means including a second normally conductive transistor connected across said source of energy for providing a current path across said motor, said path having a connection point between said motor and said first transistor so that current in said path provides a reverse bias on said first transistor to render said first transistor non-conductive; and means responsive to occurrence of a driving signal for rendering said second transistor non-conductive and removing the reverse bias from said first transistor whereby current may flow from said source of electrical energy through said motor, said responsive means being ineffective to hold said second transistor non-conductive upon cessation of a driving signal whereby upon cessation of a driving signal said second transistor becomes conductive to establish a dynamic braking circuit for said motor and the current therethrough provides a reverse bias on said first transistor to render said first transistor non-conductive.

7. An arrangement for driving an object toward a desired position in response to an applied signal comprising:

(a) a motor having an armature circuit connected across positive and negative busses and an energized field circuit adapted to be reversably connected to a source of electrical energy;

(b) a first transistor having emitter, collector and base electrodes, said emitter and collector electrodes being connected in series with the armature circuit of said motor so that said armature circuit is energized when said transistor is conducting;

(c) means providing a saturating forward bias voltage between the base and emitter electrodes of said first transistor;

(d) a first circuit path from said positive bus to said negative bus and including a second transistor having emitter, collector and base electrodes, said emitter and collector electrodes being connected between the positive bus and a connection point between said motor armature circuit and said first transistor so that said circuit path establishes a dynamic braking circuit for said motor and an interlock operative to prevent said first and second transistors from being conducting at the same time by utilizing the current in said path to reverse bias said first transistor;

(e) a second circuit path from said connection point to said negative bus, said path including said armature circuit and providing for current flow from said first circuit path through said armature circuit when said second transistor is conducting, said current having a direction effective to produce a torque on said motor in opposition to its selected direction of rotation effective to aid in halting said motor upon fadeout of dynamic braking and a magnitude less than that necessary to overcome the breakaway torque of said motor;

(f) and means including a third transistor responsive to an applied signal for causing said second transistor to be rendered nonconductive which removes the reverse bias from said first transistor to thereby automatically energize the armature circuit of said motor.

References Cited by the Examiner

UNITED STATES PATENTS

| | | | |
|---|---|---|---|
| 2,413,070 | 12/46 | Reeves | 318—380 |
| 2,606,312 | 8/52 | Rogers | 318—380 |
| 2,759,111 | 8/56 | Wideroe | 307—88.5 |
| 2,821,639 | 1/58 | Bright et al. | 307—88.5 |
| 2,885,570 | 5/59 | Bright et al. | 307—88.5 |
| 2,965,827 | 12/60 | Hohne | 318—380 |

ORIS L. RADER, *Primary Examiner.*